United States Patent
Wood

(10) Patent No.: US 7,092,166 B1
(45) Date of Patent: Aug. 15, 2006

(54) MICROLENS SHEETS HAVING MULTIPLE INTERSPERSED ANAMORPHIC MICROLENS ARRAYS

(75) Inventor: Robert L. Wood, Cary, NC (US)

(73) Assignee: Bright View Technologies, Inc., Morrisville, NC (US)

( * ) Notice: Subject to any disclaimer, the term of this patent is extended or adjusted under 35 U.S.C. 154(b) by 0 days.

(21) Appl. No.: 11/113,846

(22) Filed: Apr. 25, 2005

(51) Int. Cl.
 G02B 27/10 (2006.01)
 G03B 21/60 (2006.01)

(52) U.S. Cl. ..................... 359/626; 359/455
(58) Field of Classification Search ............ 359/626, 359/628, 619, 620, 668–671, 432, 455–456
See application file for complete search history.

(56) References Cited

U.S. PATENT DOCUMENTS

| 4,172,219 A | 10/1979 | Deml et al. |
| 6,829,087 B1 | 12/2004 | Freese et al. |
| 2002/0145797 A1* | 10/2002 | Sales .................. 359/456 |
| 2004/0004770 A1 | 1/2004 | Ebina et al. |
| 2004/0017612 A1 | 1/2004 | Fadel et al. |
| 2005/0058947 A1 | 3/2005 | Rinehart et al. |
| 2005/0058948 A1 | 3/2005 | Freese et al. |
| 2005/0058949 A1 | 3/2005 | Wood et al. |

* cited by examiner

Primary Examiner—Alicia M Harrington
(74) Attorney, Agent, or Firm—Myers Bigel Sibley & Sajovec, P.A.

(57) ABSTRACT

Microlens sheets include a first array of anamorphic micolenses on a face of a substrate. The microlenses in the first array are defined by a first parametric model along a direction of the first array. A second array of anamorphic micolenses is also provided on the face of the substrate, and interspersed with the first array. The microlenses in the second array are defined by a second parametric model that is different from the first parametric model, along the direction of the first array.

43 Claims, 13 Drawing Sheets

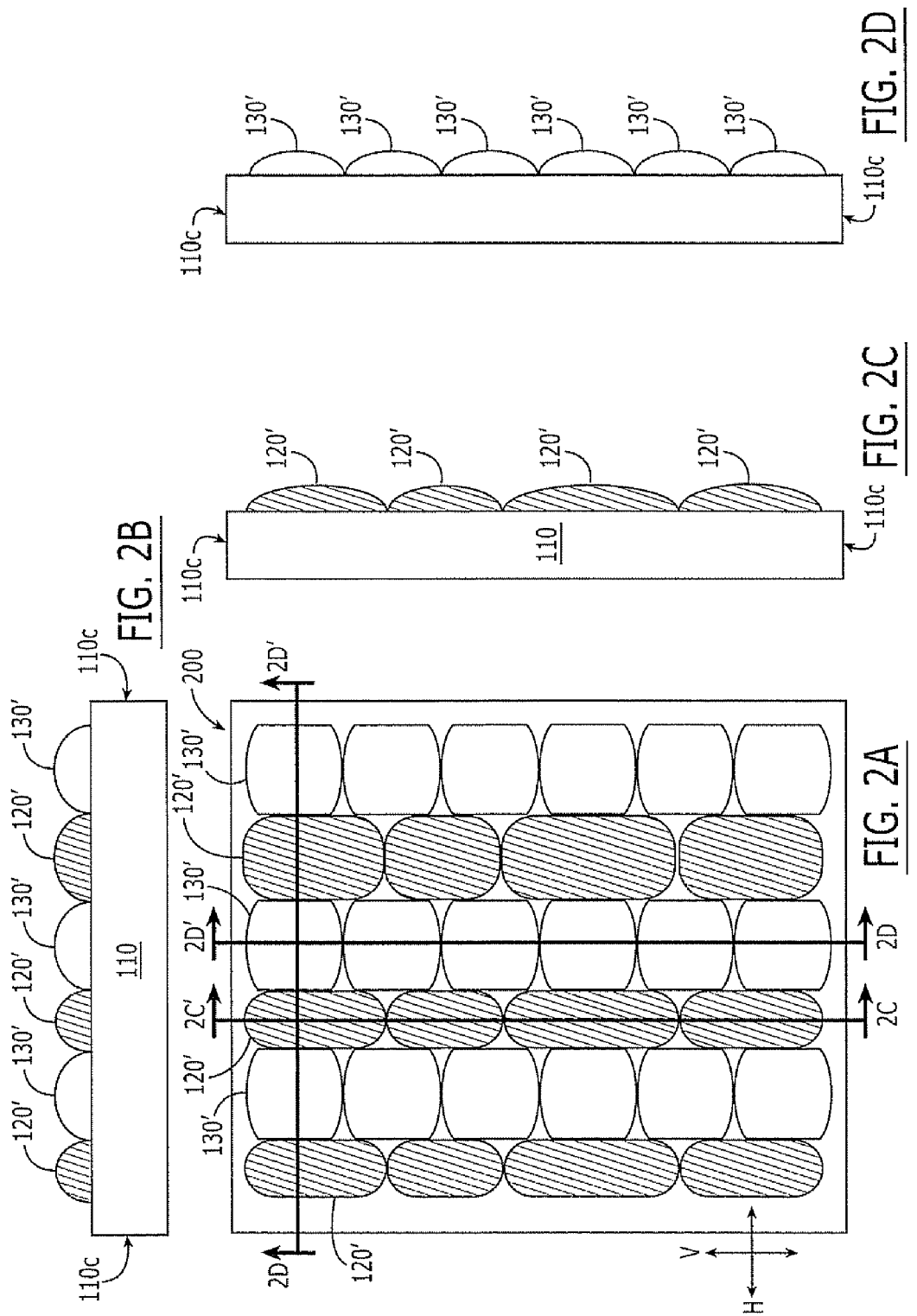

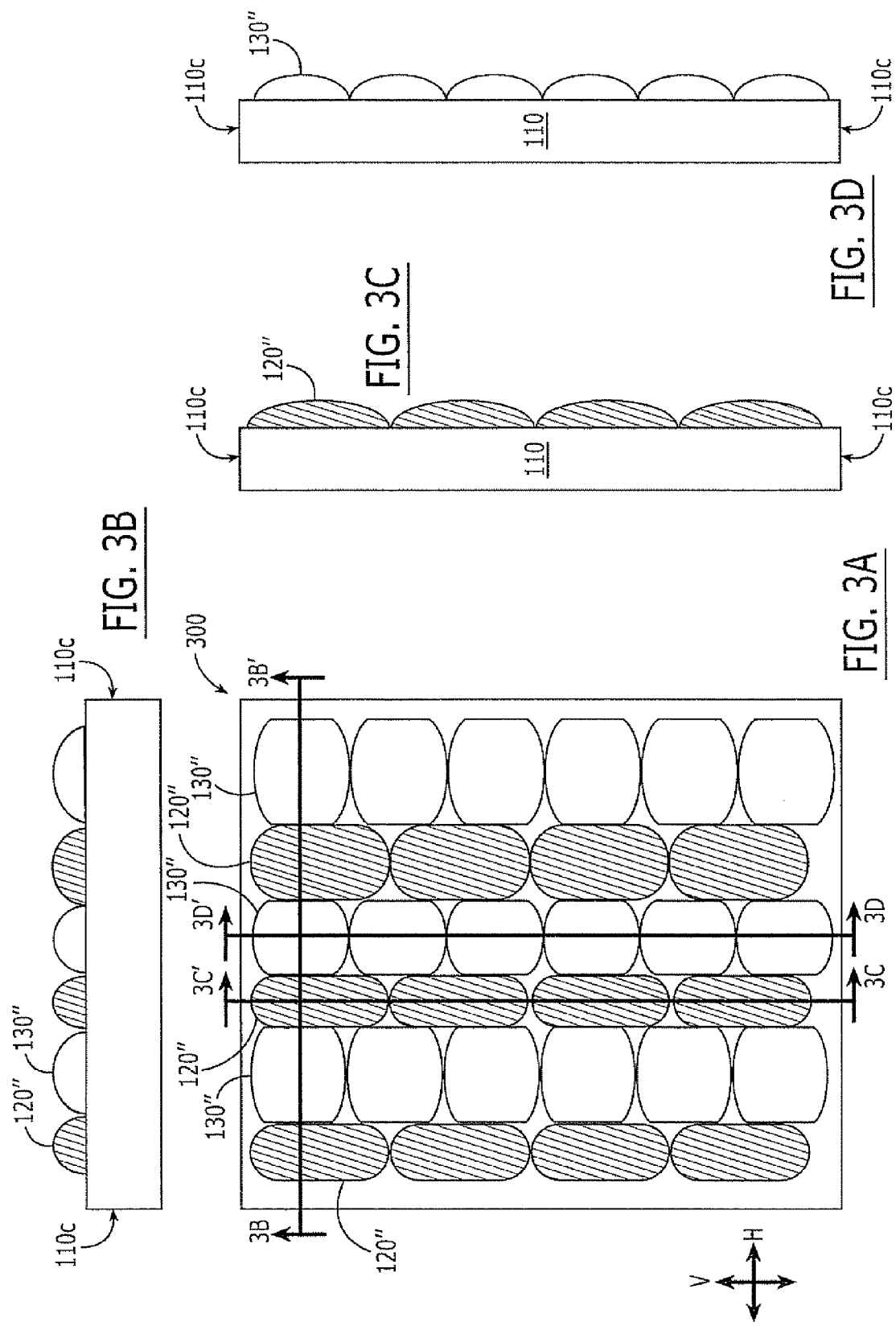

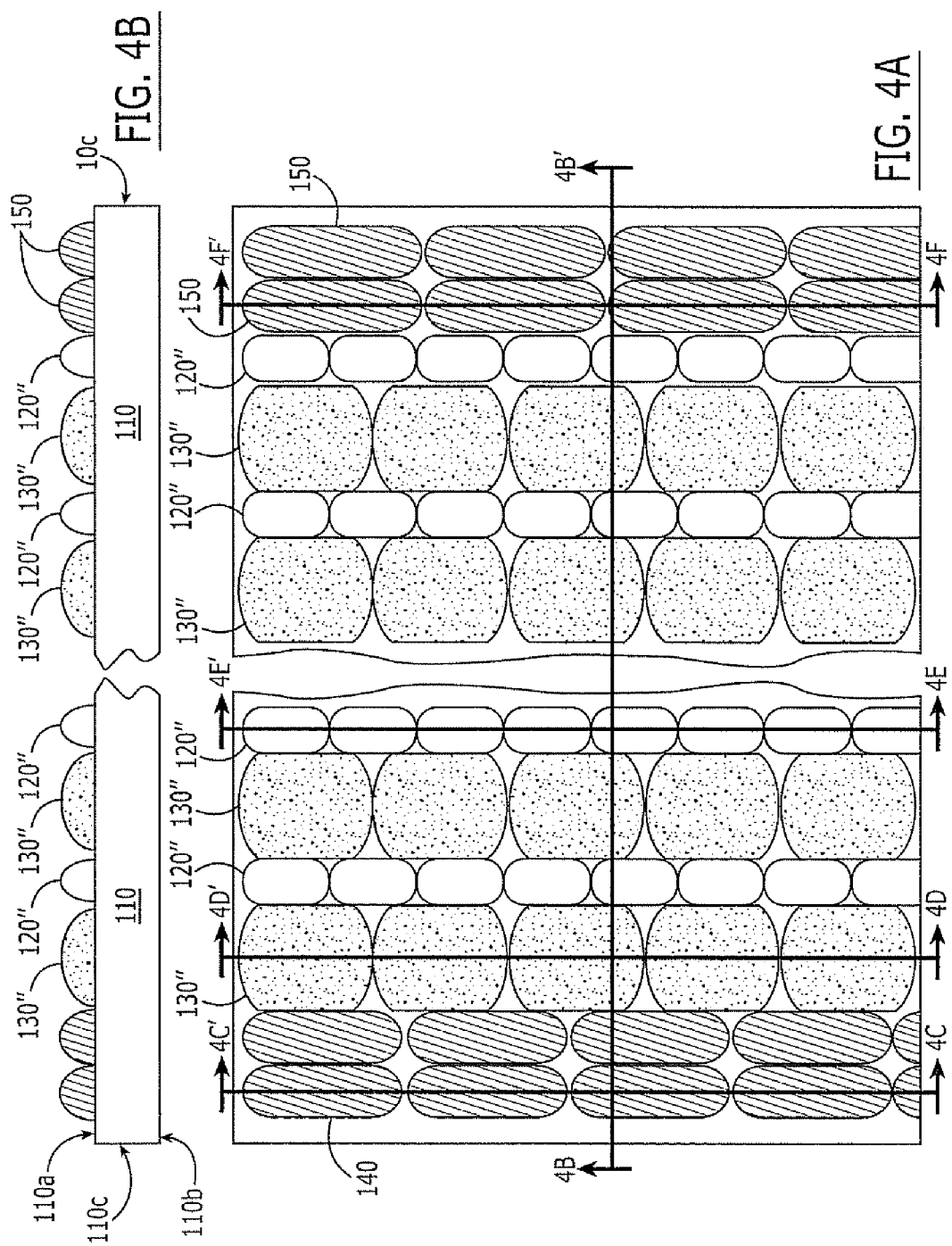

Each point (X,Y) is computed as follows:

$X = A_x t^3 + B_x t^2 + C_x t$ $Y = A_y t^3 + B_y t^2 + C_y t$

Where t is a parameter between 0 - 1,
X is a value from 0 - 1, and
Y is a value from AR/2 - 0, and
AR = lens aspect ratio (lens height divided by lens width)

Scale each point (X,Y) to match focal length with substrate thickness using scalar multiplier S

Parametrics:
$X = A_X t^3 + B_X t^2 + C_X t$
$Y = A_Y t^3 + B_Y t^2 + C_Y t$
| | X | Y |
|---|---|---|
| A | −0.74 | −0.20 |
| B | 0.75 | −0.9 |
| C | 0.99 | 0 |
AR = 1.1
S = 41.9
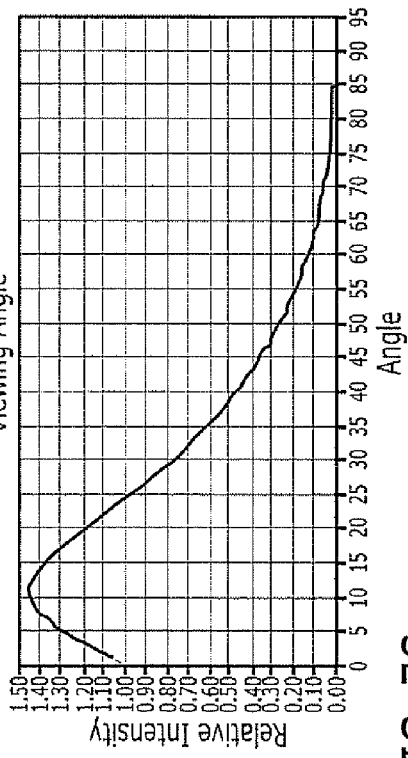
FIG. 7B
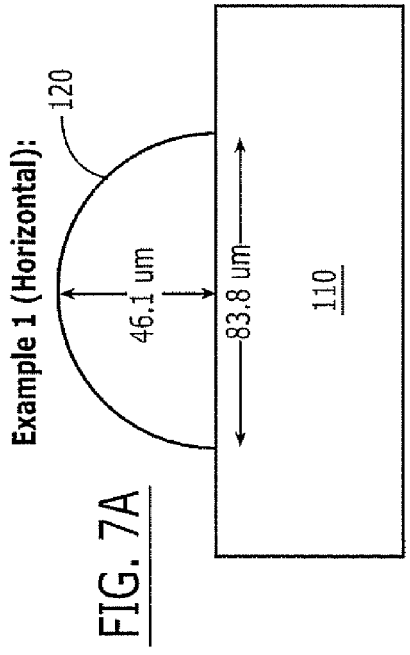
Example 1 (Horizontal):
FIG. 7A
Light Distribution:
FWHM = 77 degrees
FIG. 7C

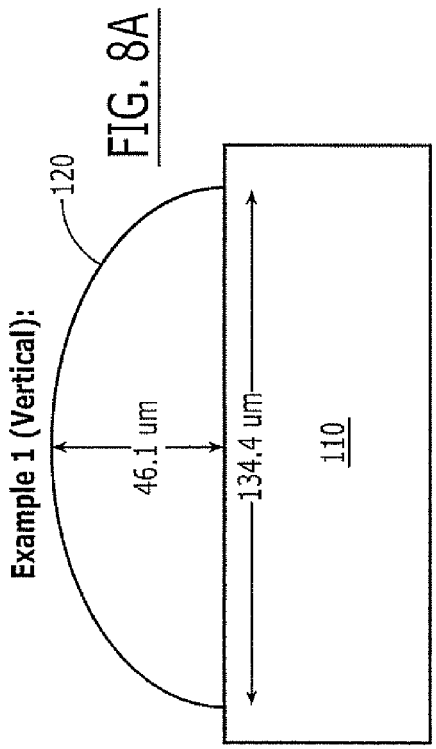
Example 1 (Vertical):
FIG. 8A
Parametrics:
$X = A_x t^3 + B_x t^2 + C_x t$
$Y = A_y t^3 + B_y t^2 + C_y t$
| | X | Y |
|---|---|---|
| A | -1.52 | -0.71 |
| B | 2.1 | 0.064 |
| C | 0.42 | -0.041 |
AR = 0.343
S = 67.2
FIG. 8B
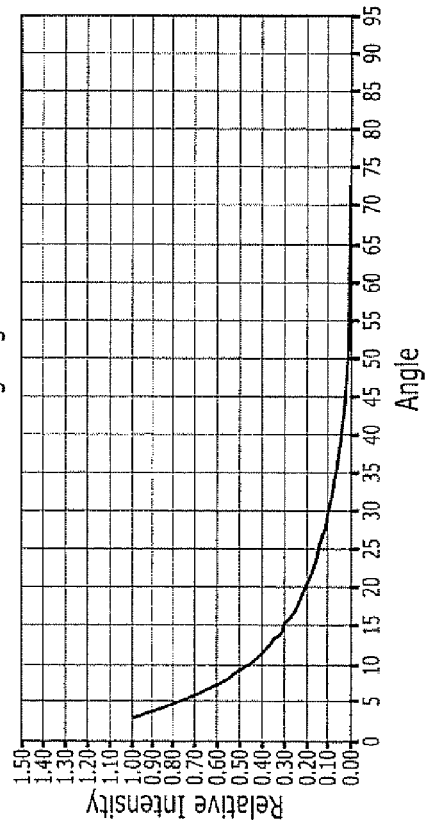
Light Distribution:
FIG. 8C
FWHM = 18.6 degrees

Example 2 (Horizontal):
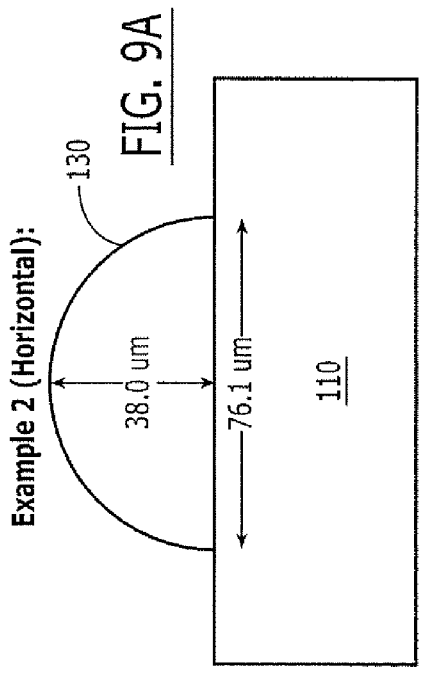
FIG. 9A
Parametrics:
$X = A_x t^3 + B_x t^2 + C_x t$
$Y = A_y t^3 + B_y t^2 + C_y t$
| | X | Y |
|---|---|---|
| A | -.05 | 0.65 |
| B | -.78 | -1.65 |
| C | 1.83 | 0 |
AR = 1.0
S = 38.05
FIG. 9B
Light Distribution:
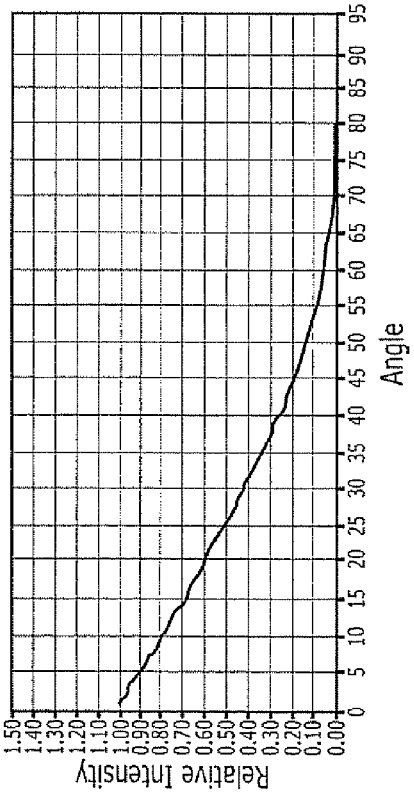
FWHM = 49 degrees
FIG. 9C

Example 2 (Vertical):
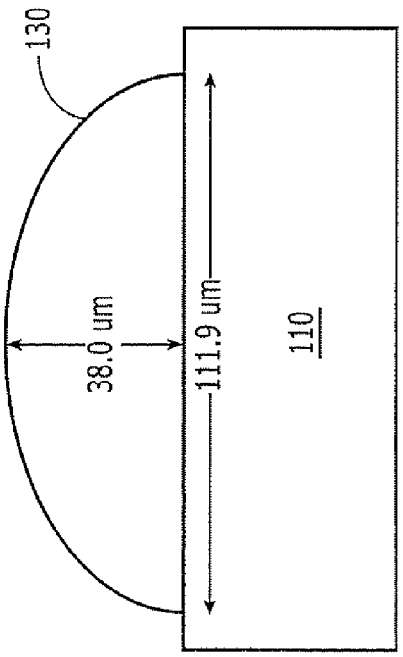
FIG. 10A
Parametrics:
$X = A_x t^3 + B_x t^2 + C_x t$
$Y = A_y t^3 + B_y t^2 + C_y t$
| | X | Y |
|---|---|---|
| A | -1.52 | -0.71 |
| B | 2.1 | 0.064 |
| C | 0.42 | -0.041 |
AR = 0.343
S = 55.95
FIG. 10B
Light Distribution:
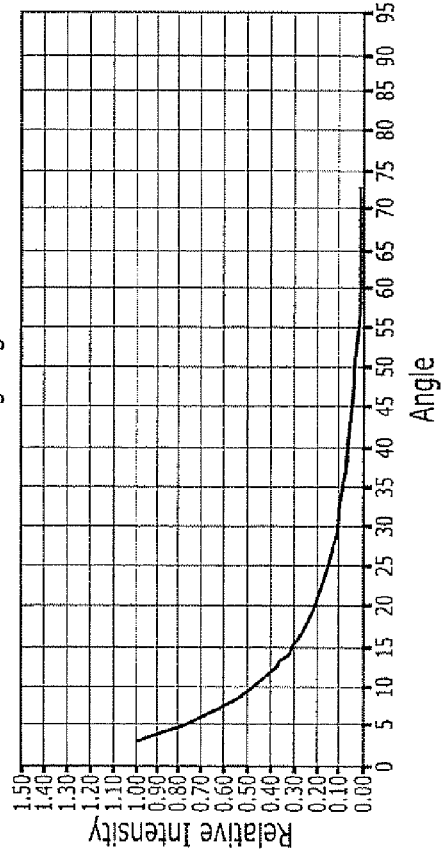
FWHM = 18.6 degrees
FIG. 10C

Example 3 (Horizontal):
- Combine lens examples 1 and 2 in a composite array
- 3:2 ratio of example 2 lens and example 1 lens Lens 1: 83.8 um wide X 46.1 um high
Lens 2: 76.1 um wide X 38.0 um high

MICROLENS SHEETS HAVING MULTIPLE INTERSPERSED ANAMORPHIC MICROLENS ARRAYS

FIELD OF THE INVENTION

This invention relates to optical structures, and more specifically to microlens sheets.

BACKGROUND OF THE INVENTION

Microlens sheets are widely used in front and/or rear projection screens for television, computer monitor and/or other viewing systems, and in many other applications. As used herein, a microlens is a lens having a size which is on the order of microns, for example on the order of about 5 μm to about 1000 μm in size.

A microlens sheet that may be used for front and/or rear projection viewing systems may include a substrate having first and second opposing faces, an array of microlenses on the first face and a corresponding array of apertures on the second face. The microlenses can provide divergence of light falling on the screen along first and second directions, such as horizontal and vertical directions, to thereby fill a desired viewing space. These microlenses may generally have an anamorphic (i.e., non-rotationally symmetric) shape that may result in a broader divergence in the horizontal direction than in the vertical direction. The aperture(s) opposing each microlens may permit light which is projected on the screen to pass to the viewing space, while blocking or reducing ambient light reflecting from the screen, which can improve contrast of the projected image.

Conventional techniques for creating microlens arrays with aperture masks may involve fabrication of the arrays on suitable substrates which are or can be coated with appropriate radiation absorbing mask materials. High intensity radiation is then directed through the lenses and focused by them. If the structure of the lens array, substrate and mask has been designed so that the focal points of the lens array are at or near the mask layer, the radiation will form apertures in the mask at these focal points. See, for example, U.S. Pat. No. 4,172,219 to Deml et al., entitled Daylight Projection Screen and Method and Apparatus for Making the Same. Moreover, a non-ablative process for fabricating a light absorbing layer is described in Published United States Patent Application No. US 2004/0017612 A1, entitled Micro-Lens Array With Precisely Aligned Aperture Mask and Methods Of Producing Same, published Jan. 29, 2004, assigned to the assignee of the present invention, the disclosure of which is hereby incorporated herein by reference in its entirety as if set forth fully herein.

The microlenses may be any shape, size, or configuration provided that they cause light rays arriving from a prescribed direction to converge to a convergence zone beyond the lens. The size of the lenses may be small enough such that individual lenses generally are smaller than the size of individual image pixels projected from the image projector. The microlens shape may be constant and/or may vary across the surface of the screen, and may be lenticular, spherical, aspherical, anamorphic, prism-shaped, pyramidal shape, combinations and subcombinations thereof and/or other shapes. Microlenses may be fabricated, for example, as described in Published United States Patent Application Nos. US 2005/0058947 A1 to Rinehart et al., entitled Systems And Methods for Fabricating Optical Microstructures Using a Cylindrical Platform and a Rastered Radiation Beam; US 2005/0058948 A1 to Freese et al., entitled Systems and Methods for Mastering Microstructures Through a Substrate Using Negative Photoresist and Microstructure Masters So Produced; and/or US 2005/0058949 A1 to Wood et al., entitled Systems and Methods for Fabricating Microstructures by Imaging a Radiation Sensitive Layer Sandwiched Between Outer Layers, and Microstructures Fabricated Thereby, all published Mar. 17, 2005, and assigned to the assignee of the present invention, the disclosures of which are hereby incorporated herein by reference in their entirety as if set forth fully herein.

In a projection screen that uses a microlens sheet, a respective microlens may be designed to efficiently collect incident light, and to focus this light to a convergence point, in order to pass through the aperture and provide divergence of imaging light beyond the convergence point in a manner appropriate for the desired horizontal and vertical viewing angles of the screen. Many approaches have been proposed for the design of such microlenses, including various mathematical formulas describing the shape of the lens. In general, such lenses may have a planoconvex shape, and may have different radii of curvature depending on the specific cross section of lens that is desired. For example, a lens with an anamorphic shape may be desirable for creating highly divergent light in the horizontal light in the horizontal plane, while limiting divergence in the vertical plane. Such an anamorphic lens may have a smaller base in the horizontal plane and a larger base in the vertical plane. A design of a microlens sheet having an array of anamorphic lenses is described in Published United States Patent Application US 2004/0004770 A1 to Ebina et al., entitled Microlens Sheet and Projection Screen. As stated in the abstract of the Ebina et al. published application, in order to provide a microlens sheet in which unit lenses are disposed in highly accurate pitch so as to control the light diffusing characteristics of the light emission direction not only in a horizontal direction but also over 360 degrees by using the lens function of one piece of lens sheet, a microlens sheet has a microlens array section in which unit lenses are disposed in approximate matrix in a second dimensional manner on at least one surface of a base board, and the microlens array section is formed on only one surface of the base board, the microlens array section includes the unit lens having an aspherical shape, and disposition pitch of neighboring unit lenses is 200 μm or shorter.

For commercially desirable viewing screens, it may be desirable to produce a relatively large full-width at half maximum (FWHM) angle. In other words, it may be desirable for the light intensity to fall off with angle from normal to the substrate (0°), such that the light intensity reaches half its on axis intensity at +/– a relatively large a viewing angle from the normal. It may also be desirable for the light intensity to have a smooth distribution as viewing angle is increased, with the intensity falling monotonically (i.e., consistently decreasing without increasing), with an increase in viewing angle. Unfortunately, it may be difficult to design microlens sheets with a desired FWHM and desired intensity distribution characteristics using conventional techniques.

SUMMARY OF THE INVENTION

Microlens sheets according to various embodiments of the present invention include a first array of anamorphic microlenses on a face of a substrate, the microlenses in the first array being defined by a first parametric model along a direction of the first array. A second array of anamorphic microlenses is also provided on the face of the substrate, and interspersed with the first array. The microlenses in the second array are defined by a second parametric model that is different from the first parametric model, along the direction of the first array. It has been found, according to various embodiments of the present invention, that by providing at least two interspersed arrays of anamorphic microlenses, desired microlens array characteristics, such as full-width at half maximum angle and/or light intensity distribution, may be produced that are different from the characteristics that are produced by either individual array.

In some embodiments of the invention, the microlenses in the first array are defined by a first constant and/or variable parametric model along the direction of the first array, and the microlenses in the second array are defined by a second different constant and/or variable parametric model along the direction of the first array. Moreover, in some embodiments, the direction is a horizontal direction and the first array may also be defined by a third parametric model along a vertical direction of the first array, and the second array may also be defined by a fourth parametric model that is different from the third parametric model, along the vertical direction of the first array. The third and/or fourth parametric models may be constant and/or variable along the vertical direction. Moreover, in yet other embodiments, the third through fourth parametric models may be different constant and/or variable parametric models from one another.

In some embodiments, the interspersed arrays of anamorphic microlenses may extend to the periphery of the substrate. In other embodiments, a third array of microlenses may be provided on the first face of the substrate adjacent the periphery that is not interspersed with the first and second arrays. The third array of microlenses may extend along the vertical direction.

Microlens sheets according to still other embodiments of the present invention include a first array of microlenses on a first face of a substrate, wherein the first array has a first full-width at half maximum (FWHM) angle, and a first intensity distribution as a function of angle. A second array of microlenses also is provided on the first face and interspersed with the first array. The second array has a second FWHM angle that is different from the first FWHM angle and a second intensity distribution as a function of angle that is different from the first intensity distribution as a function of angle. The first and second arrays are interspersed so as to create a third FWHM angle for the microlens sheet that is different from the first and second FWHM angles, and to create a third intensity distribution as a function of angle for the microlens sheet that is different from the first and second intensity distributions as a function of angle. In some embodiments, the first and/or second intensity distributions are non-monotonic and the third intensity distribution is monotonic. In other embodiments, the third FWHM lies between the first and second FWHMs.

In still other embodiments of the present invention, a plurality of microlenses are provided on a first face of a substrate that are configured to produce an FWHM angle for the substrate of at least 60°, and to produce a monotonically decreasing intensity distribution as a function of increasing angle from 0° (normal or on-axis) up to the half maximum angle. In some embodiments, the FWHM angle of at least 60° and the monotonically decreasing intensity distribution are produced along the horizontal direction.

Embodiments of the present invention have been described above in connection with microlens sheets. However, other embodiments of the present invention can add a masking layer on the substrate, opposite the microlens arrays, and including an array of apertures therein. Moreover, yet other embodiments of the present invention can provide a projection screen that includes a microlens sheet according to various embodiments of the present invention, a master comprising a replica of a microlens sheet according to various embodiments of the present invention and/or a stamper comprising an inverted replica of a microlens sheet according to various embodiments of the present invention. Analogous methods of fabricating microlens sheets also may be provided according to other embodiments of the present invention. Moreover, the various embodiments of the invention described above may be combined in various combinations and/or subcombinations according to other embodiments of the invention.

BRIEF DESCRIPTION OF THE DRAWINGS

FIG. 2A is a plan view, and FIGS. 2B–2D are cross-sectional views, of microlens sheets according to other embodiments of the present invention.

FIG. 3A is a plan view, and FIGS. 3B–3D are cross-sectional views, of microlens sheets according to yet other embodiments of the present invention.

FIG. 4A is a plan view, and FIGS. 4B–4F are cross-sectional views, of microlens sheets according to still other embodiments of the present invention.

FIGS. 7A, 7B and 7C are a cross-sectional view, a table of parametric generation and a graph of simulated light distribution, respectively, in the horizontal direction, for a first example of a microlens array according to exemplary embodiments of the present invention.

FIGS. 8A, 8B and 8C are a cross-sectional view, a table of parametric generation and a graph of simulated light distribution, respectively, in the vertical direction, for a first example of a microlens array according to exemplary embodiments of the present invention.

FIGS. 9A, 9B and 9C are a cross-sectional view, a table of parametric generation and a graph of simulated light distribution, respectively, in the horizontal direction, for a second example of a microlens array according to exemplary embodiments of the present invention.

FIGS. 10A, 10B and 10C are a cross-sectional view, a table of parametric generation and a graph of simulated light distribution, respectively, in the vertical direction, for a second example of a microlens array according to exemplary embodiments of the present invention.

DETAILED DESCRIPTION

Figure 1A:
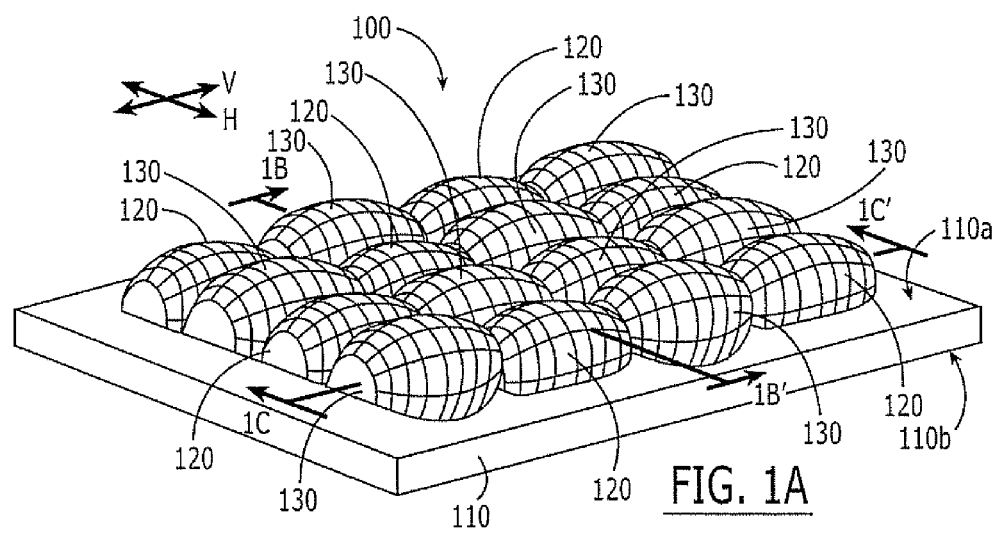
FIG. 1A is a perspective view.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. As used herein the term "and/or" includes any and all combinations of one or more of the associated listed items and may be abbreviated as "/".

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, regions, steps, operations, elements, and/or components, but do not preclude the presence or addition of one or more other features, regions, steps, operations, elements, components, and/or groups thereof.

It will be understood that when an element such as a layer or region is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, materials, regions, layers and/or sections should not be limited by these terms. These terms are only used to distinguish one element, material, region, layer or section from another element, material, region, layer or section. Thus, a first element, material, region, layer or section discussed below could be termed a second element, material, region, layer or section without departing from the teachings of the present invention. In particular, as used herein, the relative terms "first direction" and "second direction" mean two different, not necessarily orthogonal, directions, whereas the terms "horizontal" and "vertical" indicate specific orientations based upon the ultimate orientation of the microlens sheet in a projection screen or other device. Moreover, the terms "front" and "back" are used herein to describe opposing outward faces of a front projection screen. Conventionally, the viewing face is deemed the front, but the viewing face may also be deemed the back, depending on orientation.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated, typically, may be rounded. Thus, the regions illustrated in the figures are schematic in nature and their shapes are not intended to illustrate the precise shape of a region and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1B:
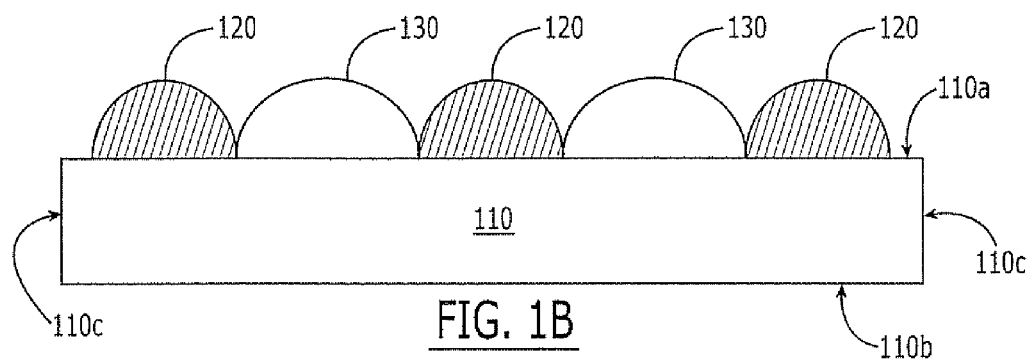
FIGS. 1B and 1C are cross-sectional views, of microlens sheets according to various embodiments of the present invention.
Figure 1C:
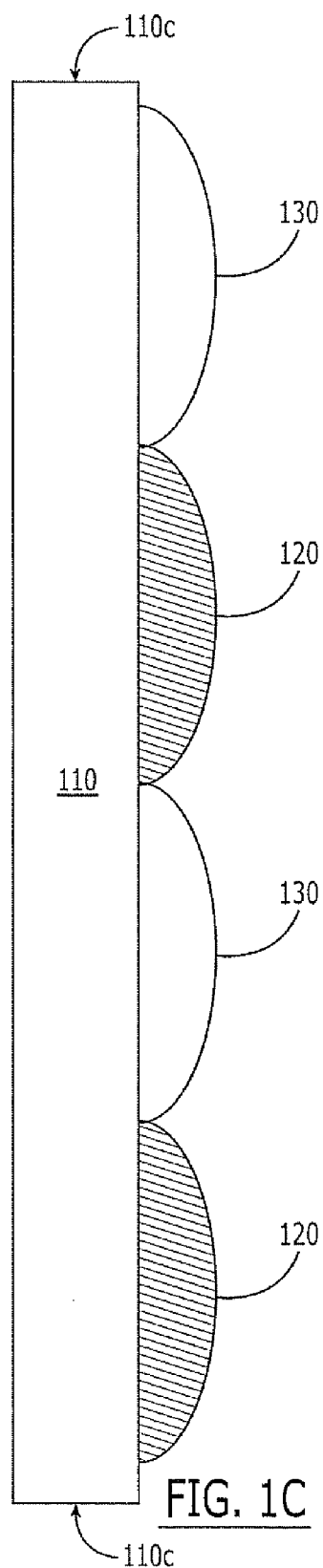

FIGS. 1A–1C are a perspective view and side cross-sectional views of microlens sheets according to various embodiments of the present invention. As shown in FIGS. 1A–1C, the microlens sheet 100 includes a substrate 110 having first and second opposing faces 110$a$ and 110$b$, respectively. First and second arrays of anamorphic microlenses 120 and 130, respectively, are provided on the first face 110$a$ and are interspersed with one another. As shown in FIG. 1B, the first and second arrays of anamorphic microlenses 120 and 130 may be interspersed uniformly and/or non-uniformly, in a one-to-one or other ratio.

Still referring to FIGS. 1A–1C, the microlenses 120 in the first array are defined by a first parametric model along a direction of the first array. The direction may be the horizontal direction (H), the vertical direction (V) or another direction. For example, in FIG. 1A, the direction is shown as the horizontal direction, as indicated by the cross-section of FIG. 1B.

Still referring to FIGS. 1A–1C, the microlenses 130 in the second array are defined by a second parametric model that is different from the first parametric model along the direction of the first array. Thus, as shown in FIG. 1B, the parametric model of the first and second arrays are different. In FIG. 1B, two different aspherical (i.e., departing from sphericity) parametric models are illustrated along the horizontal direction. In other embodiments, one of the parametric models may be spherical and the other parametric model may be aspherical along the direction. In still other embodiments, both of the parametric models may be spherical, but the sizes (scaling factor) of the two arrays may be different. It will be understood that in embodiments of FIGS. 1A–1C, the microlenses in the first and second arrays may be identical along a second direction of the array, for example the vertical direction, as shown in FIG. 1C. However, in other embodiments, different parametric models also may be used along the second direction, as will be described in detail below.

It also will be understood that, in FIGS. 1A–1C, the microlenses in the first array 120 and the microlenses in the second array 130 are defined by respective first and second different constant parametric models. As used herein, the term "constant parametric model" means that the parametric model remains the same at different lens positions along the given direction of the array. In other embodiments, the first and/or second parametric model may be a first and/or second variable parametric model. As used herein, a "variable parametric model" means that the parametric model varies with lens position along the given direction. Specific examples will be provided below.

FIGS. 2A–2D illustrate microlens sheets 200 according to other embodiments of the present invention, wherein the first array 120' is defined by a first constant parametric function in a first direction thereof (shown as the horizontal direction in FIG. 2B) and a variable parametric function in a second direction thereof (shown as the vertical direction in FIG. 2C). The second array 130' has a constant parametric model along the first direction (shown in FIG. 2B) and a different constant parametric model along a second direction of the array (shown in FIG. 2D).

FIGS. 3A–3D illustrates other embodiments of the invention, wherein the microlens sheet 300 includes a first array of anamorphic microlenses 120" having variable first parametric model along the first direction of the array (shown in FIG. 3B) and a constant parametric model along the second direction of the array (shown in FIG. 3C). The second array of anamorphic microlenses 130" has a variable third parametric model along the first direction of the array (shown in FIG. 3B) and a constant parametric model along the second direction of the array (shown in FIG. 3D).

Accordingly, FIGS. 1A–1C, 2A–2C and 3A–3C illustrate that any combination of constant and/or variable parametric models may be used according to embodiments of the present invention, as long as the first and second arrays of first and second anamorphic microlenses are defined by two different parametric models along at least a single direction of the array. In some embodiments, the first through fourth parametric models are different constant and/or variable parametric models from one another. Moreover, in some embodiments, the first array 120, 120', 120" includes a narrower base on the horizontal direction (FIGS. 1B, 2B and/or 3B) than along the vertical direction (FIGS. 1C, 2C and/or 3C).

Figure 4F:
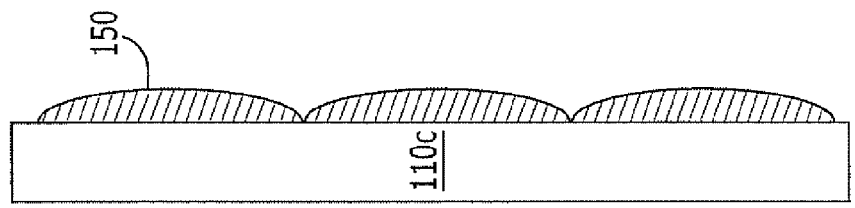
Figure 4E:
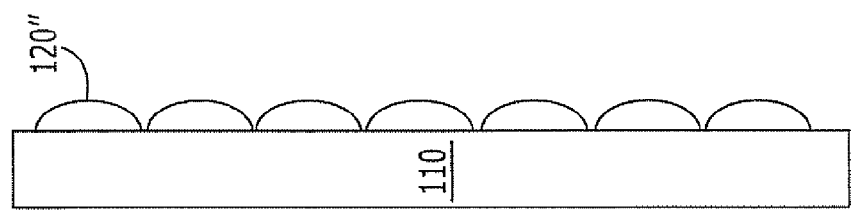
Figure 4D:
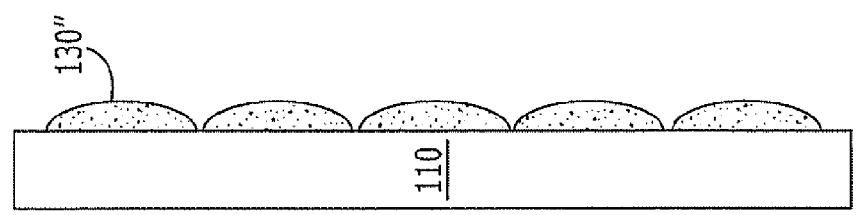
Figure 4C:
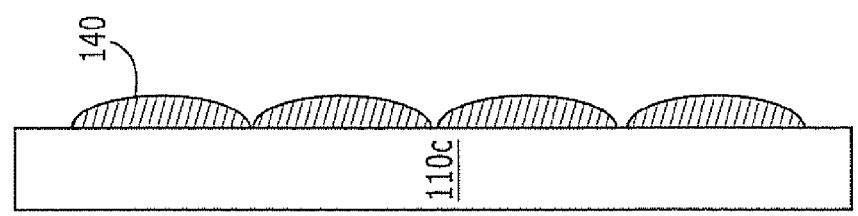

Embodiments of FIGS. 1–3 illustrate microlens sheets wherein the first and second arrays of anamorphic microlenses extend to the periphery 110c of the substrate 110. However, in other embodiments of the present invention, as shown, for example, in FIGS. 4A–4F, the microlens sheet further includes a third array of microlenses 140 on the first face adjacent the periphery 110c that is not interspersed with the first and second arrays 120", 130". This third array 140 may extend in the vertical direction, as shown in FIG. 4A, and may provide additional light shaping qualities, as desired. A fourth array 150 also may be provided at the periphery 110c of the substrate 110. The use of a different array at a periphery of a microlens sheet is described in U.S. Pat. No. 6,829,087 to Freese et al., entitled Micro-Lens Array Based Light Transmitting Screen With Tunable Gain, assigned to the assignee of the present invention, the disclosure of which is hereby incorporated herein by reference in its entirety as if set forth fully herein.

Figure 5:
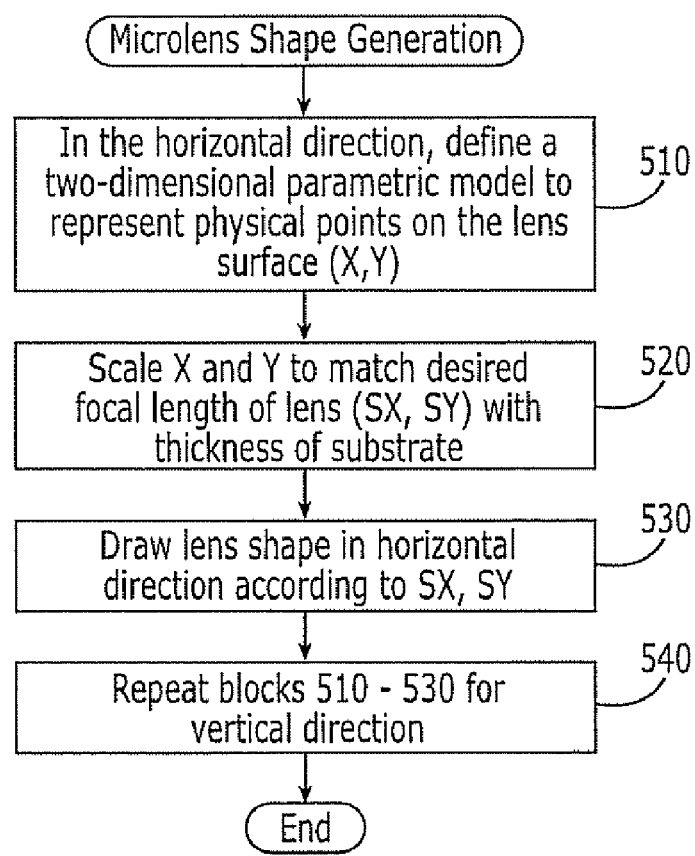
FIG. 5 is a flowchart of operations that may be performed to generate various microlens shapes according to various embodiments of the present invention.

FIG. 5 is a flowchart of operations that may be performed to generate the shape of the first and second arrays of anamorphic microlenses according to various embodiments of the present invention. In a given direction, the shape of an anamorphic microlens may be aspherical or spherical, and may, in general, be defined by a two-dimensional parametric model. The parametric model may be expressed as a polynomial for aspherical microlenses and as a constant radius for spherical lenses. After describing these operations in connection with FIG. 5, many different examples will be provided.

In particular, referring to FIG. 5 at Block 510, in the horizontal direction, a two-dimensional (2-D) parametric model is defined to represent physical points on the lens surfaces in terms of coordinates X, Y. Then, at Block 520, the X and Y coordinates are scaled to match a desired focal length of the lens with the thickness of the substrate 110, to provide scaled values SX, SY. At Block 530, the lens shape is drawn in the horizontal direction according to SX, SY.

Then, at Block 540, Blocks 510–530 are repeated for the vertical direction. It will be understood by those having skill in the art that computations for the vertical direction may be performed prior to the horizontal direction or these computations may be performed simultaneously and/or in an interleaved manner.

Figure 6A:
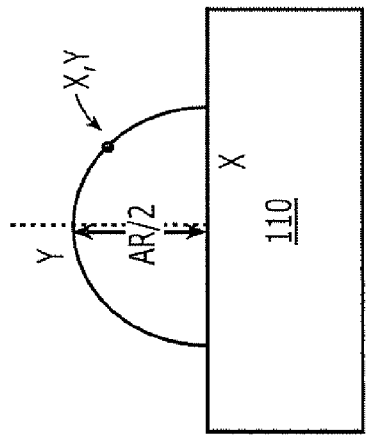
FIG. 6A conceptually illustrates defining a two-dimensional parametric model according to exemplary embodiments of the invention.

FIG. 6A illustrates defining a two-dimensional parametric model, as was described generally in Block 510 of FIG. 5, according to exemplary embodiments of the invention. As shown in FIG. 6A, in some embodiments, each point (X, Y) is computed based on a third order polynomial. It will be understood that higher and/or lower order polynomials may be used in other embodiments, and/or other parametric representations may be used. A dummy variable t is used in order to solve the two polynomial equations of FIG. 6A for X and Y. The variable t is varied between 0 and 1, to provide values of X that vary from 0 to 1, and values of Y that vary from AR/2 to 0, where AR is the lens aspect ratio. Accordingly, a normalized parametric model is provided in Block 510 and FIG. 6A, wherein the X dimension varies between 0 and 1, and the Y dimension varies between half the aspect ratio and 0. The value AR/2 is commonly referred to as the half width of the lens. In some embodiments, the parameter t may be varied in fine increments, for example, increments of 0.001, to calculate the values of X and Y, and thereby define the normalized parametric values.

Figure 6B:
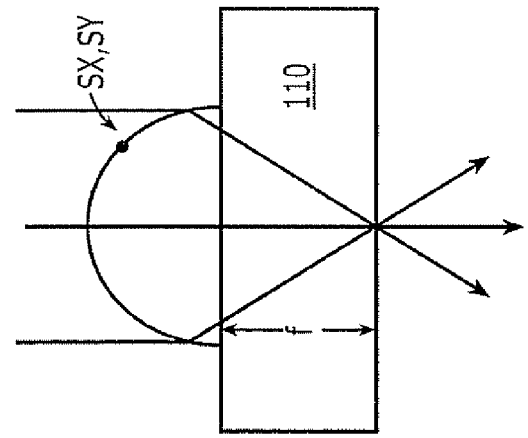
FIG. 6B illustrates scaling a two-dimensional parametric model according to exemplary embodiments of the invention.

Then, as shown in Block 520 of FIG. 5 and in FIG. 6B, the normalized parametric model is scaled by a scalar multiplier S, to arrive at the actual physical model of the lens. The scalar multiplier S may be determined so as to match the focal length of the lens with the substrate thickness (f). Specific examples will be provided below.

The following Examples shall be regarded as merely illustrative and shall not be construed as limiting the invention. These Examples are based on simulated microlens designs.

EXAMPLE 1

FIGS. 7A–7C and FIGS. 8A–8C illustrate microlens shape generation in the horizontal and vertical directions for a first array of microlenses, such as the first array 120 of FIGS. 1A–1C, according to exemplary embodiment of the present invention. FIG. 7A illustrates the final shape of the lens 120 in the horizontal direction and FIG. 8A illustrates the final shape of the lens 120 in the vertical direction. FIGS. 7B and 8B illustrate the actual parameters A, B, C, X and Y that are used to generate this shape, as well as the value for the lens aspect ratio (AR) and the scale factor (S). Finally, FIGS. 7C and 8C illustrate the simulated light distribution in the horizontal and vertical directions for the lens. As shown in FIG. 7C, the light distribution in the horizontal direction has an FWHM of about 77° (about +/−38.5°), and has a light distribution that is not monotonic, because the light distribution increases from about 0° to about 10°, and then decreases from about 10° to about 90°. In contrast, as shown in FIG. 8C in the vertical direction, a relatively small FWHM of about 18.6° and an exponentially decreasing monotonically light distribution is shown.

EXAMPLE 2

FIGS. 9A–9C and 10A–10C illustrate microlens shape generation for a second array of anamorphic microlenses, such as the second array 130 of FIGS. 1A–1C, according to exemplary embodiments of the present invention. As shown in FIGS. 9A–9C, in the horizontal direction, this lens array has an FWHM of about 49° and a fairly linear monotonic decrease of light distribution. In the vertical direction, the identical parameters of the first array of FIGS. 8A–8C is used, as shown in FIGS. 10A–10C.

EXAMPLE 3

Figure 11A:
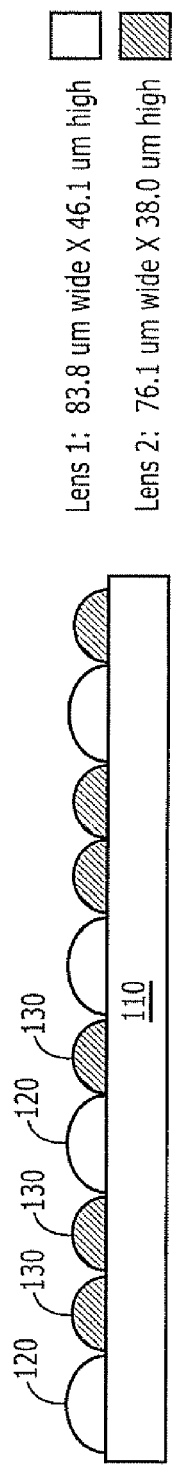
FIG. 11A is a cross-sectional view of first and second arrays of interspersed anamorphic microlenses according to exemplary embodiments of the present invention.
Figure 11B:
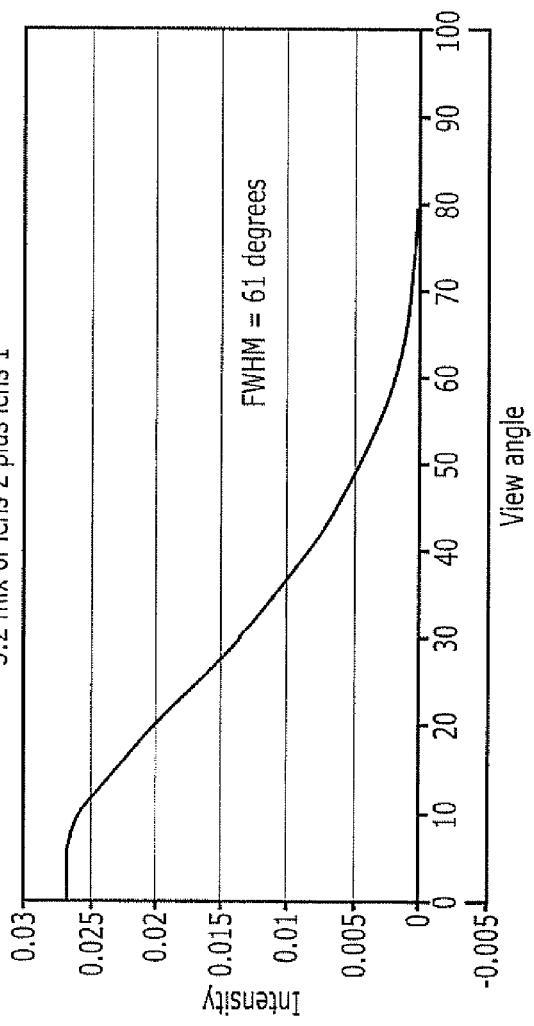
FIG. 11B graphically illustrates simulated composite light distribution for interspersed lens arrays of FIG. 11A according to exemplary embodiments of the present invention.

FIG. 11A illustrates an example of a microlens sheet according to exemplary embodiments of the present invention, wherein the first array of anamorphic microlenses 120 of Example 1 and the second array of anamorphic microlenses 130 of Example 2 are combined into a composite array. As shown in FIG. 11A, a 3:2 ratio of the Example 2 lenses (FIGS. 9A–9C and 10A–10C) and the Example 1 lenses (FIGS. 7A–7C and 8A–8C) are used. It will be understood that Example 3 is shown for the horizontal direction only, because in Examples 1 and 2, the lenses have the same characteristics in the vertical direction, as shown by FIGS. 8A–8C and 10A–10C. FIG. 11B illustrates the composite light distribution in the horizontal direction for the 3:2 mix. An FWHM of about 61° is shown. Thus, by mixing the lens arrays of Examples 1 and 2, an FWHM of 61° may be obtained, which is between the FWHM of 77° for Example 1 (FIG. 7C) and the FWHM of 49° for Example 2 (FIG. 9C). Moreover, the light distribution of FIG. 11B is monotonic, whereas the light distribution of the first array (FIG. 7C) is non-monotonic.

Accordingly, FIGS. 11A and 11B illustrate microlens sheets according to exemplary embodiments of the present invention, wherein a first array of microlenses (FIGS. 7A–7C) has a first FWHM angle and a first intensity distribution as a function of angle, and a second array of microlenses (FIGS. 9A–9C) that is interspersed with the first array has a second FWHM angle that is different from the first FWHM angle, and a second intensity distribution as a function of angle that is different from the first intensity distribution as a function of angle. As shown in FIGS. 11A and 11B, the first and second arrays are interspersed so as to create a third FWHM angle for the microlens sheet that is different from the first and second FWHM angles, and to create a third intensity distribution as a function of angle from the microlens sheet that is different from the first and second intensity distributions as a function of angle. Moreover, as shown in FIGS. 7C and 9C, according to some embodiments of the present invention, the first and/or second intensity distributions are non-monotonic as a function of angle whereas the third intensity distribution is monotonic as a function of angle (FIG. 11B). Finally, as also shown in FIG. 11B, the third FWHM (610) lies between the first and second FWHMs (77° and 49°).

FIGS. 11A and 11B also illustrate other embodiments of the present invention, wherein a plurality of microlenses are arranged on a face of a substrate, and are configured to produce an FWHM angle for the substrate of at least 60°, and to produce a monotonically decreasing intensity distribution as a function of increasing angle from 0° up to the half maximum angle. FIGS. 11A and 11B also show that this FWHM angle and monotonically decreasing intensity distribution may be produced along the horizontal direction.

Additional discussion of various embodiments of the present invention now will be provided. In particular, in order to produce horizontal divergence that is desirable for viewing screens, it may be desirable for the screen to produce an FWHM angle of at least 60°. It also may be desirable for the light intensity to fall off smoothly as viewing angle is increased, with intensity falling monotonically with view angle. It also may be desirable for the lenses to be capable of forming convergence points at a fixed and predetermined distance from the lens. These convergence points should be sufficiently small to facilitate the formation of small apertures when the lenses are to be used in an aperture creation process as was described above. Fulfilling all these desires generally may predicate the use of an aspherical lens shape. In particular, lenses having a purely spherical shape may not be able to produce an FWHM angle greater than about 45° and, therefore, may not be suitable for commercially desirable viewing screens. Moreover, aberrations produced by spherical lenses may also degrade their ability to form tightly focused convergence points and, therefore, may produce undesirably large apertures in the aperture formation process.

It has been found, according to exemplary embodiments of the invention, that, although many possible shapes of aspherical lenses can produce a desired FWHM angle and tightly focused convergent points, these designs may fail to provide a monotonic relationship between intensity and view angles. In particular, some aspheric lens shapes may produce a smooth, monotonic roll-off in intensity with viewing angle, while other shapes may produce abrupt changes in intensity with angle, may not produce the desired monotonic roll-off in intensity, or both. As appreciated by the present inventor, it has been found that lenses producing a large FWHM are more likely to have defects in their light distribution curves, such as abrupt changes in intensity or non-monotonic roll-off. This behavior may pose a difficulty in designing a lens shape that can offer all the desired properties of large divergence, tightly focused convergence spot size and smooth light distribution properties.

Embodiments of the present invention can provide display screens that can be suitable for front or rear projections. These screens include an array of microlenses that produce a controllable degree of convergence in the horizontal and vertical directions, can have tightly focused convergence spots and can produce smooth, monotonic roll-off in intensity versus view angle. Embodiments of the present invention use multiple lens shapes in the array of microlenses making up the screen. Individual microlens shapes, which may be spherical or aspheric in shape, are mixed together in a single array, to achieve the desired screen properties. Individual lens designs, which may not achieve desired properties by themselves, may be selected and mixed at a suitable proportion, such that the total population of lenses can achieve the desired result. In this manner, lenses that have large desirable FWHM angle but poor smoothness may be compensated by mixing with lenses that have low FWHM, but other good light distribution characteristics, according to some embodiments of the invention.

Mixing various lens shapes according to various embodiments of the present invention may thereby provide an unexpected degree of control in screen characteristics. The light distribution curve may now be tailored in a manner that may not have been possible using a single microlens design. Mixing lens shapes may also provide an additional potential benefit of helping reduce or eliminate screen artifacts arising from moiré effects. In particular, the physical size of individual lens designs can be varied across the array, thereby helping to break up the periodicity of the lens array and reducing moiré. Many lens designs having some desirable optical properties relating to light distribution, efficiency, packing density and/or uniformity, but which have some other flaw, may now be used to potential advantage by combining them with compensating designs, such that the composite array produces the desired properties.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A microlens sheet comprising:
   a substrate having first and second opposing faces;
   a first array of anamorphic microlenses on the first face, the microlenses in the first array being defined by a first parametric model along a direction of the first array; and
   a second array of anamorphic microlenses on the first face and interspersed with the first array, the microlenses in the second array being defined by a second parametric model that is different from the first parametric model, along the direction of the first array.

2. A microlens sheet according to claim 1 wherein the microlenses in the first array are defined by a first constant and/or variable parametric model along the direction of the first array, and the microlenses in the second array are defined by a second different constant and/or variable parametric model along the direction of the first array.

3. A microlens sheet according to claim 2 wherein the first and second parametric models comprise constant and/or variable nonrandom parametric models.

4. A microlens sheet according to claim 1 wherein the direction is a horizontal direction, wherein the first array is also defined by a third parametric model along a vertical direction of the first array and wherein the second array is also defined by a fourth parametric model that is different from the third parametric model, along the vertical direction of the first array.

5. A microlens sheet according to claim 4 wherein the first array is defined by a third constant and/or variable parametric model along the vertical direction of the first array and wherein the second array is defined by a fourth constant and/or variable parametric model along the vertical direction of the first array.

6. A microlens sheet according to claim 5 wherein the first, second, third and fourth parametric models comprise constant and/or variable nonrandom parametric models.

7. A microlens sheet according to claim 4 wherein the first array includes a narrower base along the horizontal direction than along the vertical direction.

8. A microlens sheet according to claim 4 wherein the first through fourth parametric models are different constant and/or variable parametric models from one another.

9. A microlens sheet according to claim 8 wherein the variable parametric models comprise variable nonrandom parametric models.

10. A microlens sheet according to claim 4 wherein the substrate includes a periphery thereof and wherein the first and second arrays of anamorphic microlenses extend to the periphery of the substrate.

11. A microlens array according to claim 4 wherein the substrate includes a periphery thereof and wherein the microlens sheet further comprises a third array of microlenses on the first face adjacent the periphery and extending along the vertical direction that is not interspersed with the first and second arrays.

12. A microlens sheet according to claim 4 wherein the first, second, third and fourth parametric models comprise nonrandom parametric models.

13. A microlens sheet according to claim 1 wherein the substrate includes a periphery thereof and wherein the first and second arrays of anamorphic microlenses extend to the periphery of the substrate.

14. A microlens array according to claim 1 wherein the substrate includes a periphery thereof and wherein the microlens sheet further comprises a third array of microlenses on the first face adjacent the periphery that is not interspersed with the first and second arrays.

15. A microlens array according to claim 1 further comprising a masking layer on the second face and including an array of apertures therein.

16. A projection screen comprising a microlens sheet according to claim 1.

17. A master comprising a replica of a microlens sheet according to claim 1.

18. A stamper comprising an inverted replica of a microlens sheet according to claim 1.

19. A microlens sheet according to claim 1 wherein the first parametric model produces a first fill-width at half maximum (FWHM) angle and a first intensity distribution as a function of angle, and wherein the second parametric model produces a second FWHM angle that is different from the first FWHM angle and a second intensity distribution as a function of angle that is different from the first intensity distribution as a function of angle, the first and second arrays being interspersed so as to create a third FWHM angle for the microlens sheet that is different from the first and second FWHM angles and to create a third intensity distribution as a function of angle for the microlens sheet that is different from the first and second intensity distributions as a function of angle.

20. A microlens sheet according to claim 19 wherein the first and/or second intensity distributions are non-monotonic as a function of angle and wherein the third intensity distribution is monotonic as a function of angle.

21. A microlens sheet according to claim 20 wherein the third FWHM lies between the first and second FWHMs.

22. A microlens sheet according to claim 19 wherein the first and second arrays of microlenses are configured to produce an FWHM angle for the substrate of at least 60° and to produce a monotonically decreasing intensity distribution as a function of angle from 0° up to the half maximum angle.

23. A microlens sheet according to claim 19 wherein the first and second parametric models comprise nonrandom parametric models.

24. A microlens sheet according to claim 1 wherein the first and second parametric models comprise nonrandom parametric models.

25. A microlens sheet comprising:
   a substrate having first and second opposing faces;
   a first array of microlenses on the first face, the first array having a first full-width at half maximum (F angle and a first intensity distribution as a function of angle; and
   a second array of microlenses on the first face and interspersed with the first array, the second array having a second FWHM angle that is different from the first FWHM angle and a second intensity distribution as a function of angle that is different from the first intensity distribution as a function of angle, the first and second arrays being interspersed so as to create a third FWHM angle for the microlens sheet that is different from the first and second FWHM angles and to create a third intensity distribution as a function of angle for the microlens sheet that is different from the first and second intensity distributions as a function of angle.

26. A microlens sheet according to claim 25 wherein the first and/or second intensity distributions are non-monotonic as a function of angle and the third intensity distribution is monotonic as a function of angle.

27. A microlens sheet according to claim 26 wherein the third FWHM lies between the first and second FWHMs.

28. A microlens array according to claim 25 wherein the first and second FWHM angles and the first and second intensity distributions as a function of angle are defined along a direction of the first array.

29. A microlens sheet according claim 28 wherein the microlenses in the first array are defined by a first parametric model along the direction of the first array, and wherein the microlenses in the second array are defined by a second parametric model that is different from the first parametric model, along the direction of the first array.

30. A microlens sheet according to claim 29 wherein the microlenses in the first array are defined by a first constant and/or variable parametric model along the direction of the first array, and the microlenses in the second array are defined by a second different constant and/or variable parametric model along the direction of the first array.

31. A microlens sheet according to claim 30 wherein the first and second parametric models comprise constant and/or variable nonrandom parametric models.

32. A microlens sheet according to claim 29 wherein the first and second parametric models comprise nonrandom parametric models.

33. A microlens array according to claim 25 further comprising a masking layer on the second face and including an array of apertures therein.

34. A projection screen comprising a microlens sheet according to claim 25.

35. A master comprising a replica of a microlens sheet according to claim 25.

36. A stamper comprising an inverted replica of a microlens sheet according to claim 25.

37. A microlens sheet according to claim 25 wherein the third FWHM angle is at least 60° and wherein the third intensity distribution as a function of angle monotonically decreases as a function of angle from 0° up to the half maximum angle.

38. A microlens sheet comprising:
a substrate having first and second opposing faces; and
a plurality of microlenses on the first face that are configured to produce a full-width at half maximum (FWHM) angle for the substrate of at least 60° and to produce a monotonically decreasing intensity distribution as a function of angle from 0° up to the half maximum angle.

39. A microlens sheet according to claim 38 wherein the substrate defines a horizontal direction and a vertical direction, and wherein the plurality of microlenses on the first face are configured to produce the FWHM angle for the substrate of at least 60° and to produce the monotonically decreasing intensity distribution as a function of angle from 0° up to the half maximum angle along the horizontal direction.

40. A microlens array according to claim 38 further comprising a masking layer on the second face and including an array of apertures therein.

41. A projection screen comprising a microlens sheet according to claim 38.

42. A master comprising a replica of a microlens sheet according to claim 38.

43. A stamper comprising an inverted replica of a microlens sheet according to claim 38.

* * * * *

UNITED STATES PATENT AND TRADEMARK OFFICE
CERTIFICATE OF CORRECTION

| | | |
|---|---|---|
| PATENT NO. | : 7,092,166 B1 | Page 1 of 1 |
| APPLICATION NO. | : 11/113846 | |
| DATED | : August 15, 2006 | |
| INVENTOR(S) | : Robert L. Wood | |

It is certified that error appears in the above-identified patent and that said Letters Patent is hereby corrected as shown below:

Column 12, line 54 should read as follows: --having a first full-width at half maximum (FMHM angle and--

Signed and Sealed this

Twenty-sixth Day of December, 2006

JON W. DUDAS
*Director of the United States Patent and Trademark Office*